United States Patent

Tilton et al.

[11] Patent Number: 5,314,529
[45] Date of Patent: May 24, 1994

[54] ENTRAINED DROPLET SEPARATOR

[76] Inventors: Donald E. Tilton, Rte. 1, Box 67A, Colton, Wash. 99113; Charles L. Tilton, 401 Summit Ave. N., Kent, Wash. 98031

[21] Appl. No.: 119,619

[22] Filed: Sep. 13, 1993

[51] Int. Cl.$^5$ .............................................. B01D 19/00
[52] U.S. Cl. ........................................ 96/204; 96/208; 96/216
[58] Field of Search ............... 55/459.3; 96/204, 208, 96/209, 216

[56] References Cited

U.S. PATENT DOCUMENTS 3,345,803 10/1967 Smith ................................. 96/204
3,352,090 11/1967 Stillebroer ........................... 96/208
3,523,406 8/1970 Clenoweth et al. ............. 96/204 X Primary Examiner—Charles Hart

[57] ABSTRACT

An apparatus for separating liquid from a liquid/gas mixture by establishing a laminar flow within a curved channel. Entrained liquid droplets, that have higher inertia than the gas, follow a trajectory, deviate from the gas flow lines, and impinge on the wall. The liquid droplets coalesce and migrate to the inner radius under the influence of shear from the secondary flow, where the liquid is collected and retained in an artery by capillary action. The liquid is then forced through bleed ports into the liquid drain line. The term liquid/gas mixtures is intended to include liquid/vapor mixtures as well.

10 Claims, 3 Drawing Sheets

ENTRAINED DROPLET SEPARATOR

BACKGROUND OF THE INVENTION

1. Field of the Invention

This invention relates generally to the separation of a liquid from a liquid/gas mixture, and more particularly to impingement separators. A separator with a curved flow passage provides for removing entrained droplets from a flow mixture.

2. Description of the Prior Art

Droplets are conventionally separated from gas mixtures by diffusion, directed motion in an electric field, and inertial motion. Separators in these forms are already known and may be desirable for the preservation of the environment, reasons of economy, operational safety, as well as plant safety.

Electrostatic precipitation is a process by which the separation of droplets or particles from the gas phase is effected by electrical forces.

A second type of separation process involves diffusional deposition which is based on a combination of inertial, interception and diffusion effects. The inertia effect results when inertia of a droplet causes it to deviate from the streamline of the gas and strike a collection surface. The interception effect results when the streamline passes close by the collection surface which causes individual droplets within the streamline to contact the collection surface. The diffusion effect, also known as Brownian movement, results when droplets move at random within the streamline and are subsequently forced onto the collection surface by the streamline. Electrostatic and diffusional filters are used for the separation of relatively small droplets (in the sub micron range), are associated with high costs, and are only feasible for limited installations.

A third type of separation process is inertial separation which relies on flow diversion and the momentum of the liquid droplet to impinge the droplet on a collection surface. Impingement separators such as cyclone, fin deflector, packed bed, scrubbers, and wire/fiber filters show a large variation with respect to their design and geometry and are, therefore, used for a wide range of applications. Cyclone separators and wet scrubbers are also used in the separation of dust particles. Thus, the described principals of inertial separation applies for both dust particles and droplets. Separation efficiency increases as the relative velocity between the droplet and gas increases. Large droplet diameter, high droplet density and gas velocity, and low gas viscosity provide the most favorable conditions for this separation process. Thus, impingement separators have the following limitations: cost increases as droplet size decreases; liquid is drained from the system by gravity (limiting orientation of the system); high pressure drops result from the high velocity of the gas flowing through the system; liquid flooding occurs when system drainage cannot keep up with the gas flow; and, there is a possibility of re-entrainment of the separated droplets at the liquid/vapor interface due to shear.

Cost and operating considerations of the above-identified separation processes and equipment are summarized within chapter 14, "Practical Experience with Droplet Separators in the Chemical Industry", of Armin Burkholz' book entitled *Droplet Separation*. This chapter also gives examples of various applications appropriate for the different separation processes and equipment. Chapter 14 of this book is incorporated herein by reference.

Descriptions of several patented separators are listed below. These patented separators use some of the separation processes noted above. These separators have intendant disadvantages in their use in a wide range of applications.

A fin deflector separator is known from U.S. Pat. No. 4,198,215 and comprises a series of sinusoidal shaped fins that extend transversely to the direction of the fluid flow and have liquid collection channels in the longitudinal direction. The collection channels are open at the downstream side of the deflector and are arranged so that they will not produce undesirable eddying of the mixture. The liquid is impinged on the collection surface, requiring high velocity flows for the droplets to overcome the main channel flow. The draining liquid flows in the opposite direction of the main channel flow, under the influence of gravity, in the collection channel. The fins are mounted vertically and, in this case, the maximum permissible stream velocity is lowered. At higher vapor velocities, the liquid may be re-entrained from the baffles and carried out of the separator.

Another type of separator is known from U.S. Pat. No. 4,504,285 for the inertial separation of condensable vapors from a gas mixture. The method and apparatus include a mixture of gas and condensable vapor introduced tangentially into an expansion chamber for isentropic expansion and cooling. Isentropic expansion can be achieved in a nozzle with the expansion energy used to accelerate the gas to very high velocities. A swirling nozzle is used to reach low temperatures through expansion and to utilize the expansion energy by accelerating the tangential component of the flow. The swirling effect means, however, that the nozzle performance will not be isentropic. In addition, cooling will be limited by the size of the inlet relative to the nozzle throat.

The cooled gas mixture enters a cylindrical separation chamber where the centrifugal force impinges the condensed vapors on the wall. The liquid is then removed from the separation chamber through perforations in the wall. Because the vapors are removed in a high pressure region, the dynamic pressure tangential to the wall of the tubular separator will tend to overcome capillary forces and gas will likely enter the liquid chamber. To aid the passage of liquid into the collection chamber it is suggested that a conduit at the upper portion of the chamber be connected to a low pressure region of the expansion chamber to provide a partial vacuum. This is not feasible, however, because the location suggested is a point of stagnation in the rotating gas. A more feasible alternative was suggested in another embodiment that includes a vacuum pump to aid liquid removal.

A certain percentage of the droplets cannot be effectively separated using the centrifugal separation chamber. The droplets experience the highest centrifugal force farthest from the axis of rotation. This value decreases as the distance from the axis of rotation to the droplet decreases. In addition, there is a velocity component directed towards the center of rotation that increases resistance to separation. Thus, as droplet size decreases, the limiting core radius from which no droplets can be separated, increases. For relatively small droplet sizes, such as those resulting from this type of condensation process, extremely high gas velocities and long channel lengths are required to induce separation.

These, in turn, lead to high pressure drop and shear induced re-entrainment.

The droplets that do overcome resistance to separation and follow a trajectory, impinge on the collection surface provided the following is true: the separation chamber is sufficient in length for the liquid droplets to coalesce and become large enough to overcome the drag force and the chamber is sufficient in length such that the time required for the droplet trajectory to reach the wall is less than the time required to travel the length of the tubular separator. Once separated, the liquid flows under the influence of gravity into the liquid collection chamber, limiting liquid removal to specific gravitational orientation.

Another type of separator is known from U.S. Pat. No. 4,824,449. The invention generally relates to the transformation of a fluid flow of one type to a fluid flow of another type, and more particularly to cyclone dust separators. The dust-containing gas enters the separator at a relatively high pressure and a turbulent flow is formed that moves spirally within the collection chamber. The dust is collected on the circumferential wall of the chamber due to centrifugal force. The clean gas leaves the separator through an axial passage at a relatively low pressure. The exiting gas flows counter to the dust particles; thus, a higher drag force limits particle separation to large particles and requires high velocity flows. As with fin deflector separators, separation relies on gravity limiting orientation. In addition, large pressure drops and size requirements further limit the use of cyclone separators.

Another type of separator is known from U.S. Pat. No. 3,345,803 for degassing viscose. This invention generally relates to the removal of entrained gasses from liquids, and more particularly to the removal of small gas bubbles from a viscous liquid. A laminar flow of viscose, containing gas bubbles, is established in a closed channel. A shear gradient is imposed upon the viscose between the outer and inner regions of the channel and the gas bubbles migrate inward to the regions of low shear. The gas is collected in the axial direction after the viscose has traveled a sufficient distance along the channel and the gas bubbles have accumulated in the center of the flow channel. The flow channel is formed in a spiral for compactness, but does not aid in the separation of the gas bubbles from the viscose; shear, not secondary flow, aids in the separation process.

Another spirally compact flow channel used for gas/oil separation is described within U.S. Pat. No. 4,345,920. This separator uses a vacuum pump to draw the oil/gas mix through the spiral channel. The separator is used exclusively to deaerate oil where the gas content in solution is 8 to 10 percent by volume. Dissolved air is accomplished by reducing pressure. The deaerator includes a flow passageway with a flow restricting device at its inlet to induce an initial pressure drop. The oil is propelled by a vacuum pump, also lowering the pressure on the oil. This separator is not an inertial separator.

SUMMARY OF THE INVENTION

It is the object of the present invention to provide a low cost method of separation for liquid droplets, consistent and efficient performance in any gravitational environment, compact size, and improved separation efficiency for relatively small droplet sizes.

These objects are accomplished by a method and apparatus in which a laminar flow of a liquid/gas mixture is established in a curved flow passage. Laminar flow is devoid of the intense mixing phenomena and eddies common to turbulent flow. This flow has a very smooth appearance. For fully developed flow in a curved channel, a pressure gradient exists from the inner radius of the flow channel where a low pressure region exists to a high pressure region at the outer radius of the curved channel. For gas traveling in the axial direction, a secondary flow develops where the gas has radial and angular velocity components. The secondary flow is such that the gas in the center of the channel will move toward the outer radius to the high pressure region and circulate back to the inner radius along the channel walls. A generally spiral flow pattern is formed. The secondary flow pattern is strongest in the laminar region. Undesirable eddying will limit separator performance by reducing the shear from the secondary flow that aids droplet migration to the inner radius.

The entrained droplets move towards the outer radius of the channel, and because the liquid droplets have higher inertia than the gas, they impinge on the collection surface. The droplets coalesce and migrate to the inner radius under the influence of shear from the secondary flow and remain in the collection artery by capillary action. The collection artery is connected to the liquid drain line via bleed ports. The bleed ports are located at various positions along the length of the separator and are not limited in numbers. The drain line is at a lower pressure than the main channel, so liquid removal is a continuous process as the gas flows through the entire length of the flow passage. This is a distinct advantage over many conventional separators which remove liquid only at the very end of the flow passage where re-entrainment at this single removal point has a much higher probability of occurring.

Thus, the separator of this invention is unique in several ways. First, a fundamental difference between this separator and prior art systems is that the secondary flow causes the droplets to migrate to the low pressure region of the channel where it is much easier to remove liquid without gas entering the drain line. In contrast, the impingement separator known from U.S. Pat. No. 4,504,285 removes liquid from a high pressure region. The dynamic pressure tangential to the wall of the tubular separator will tend to overcome capillary forces and gas will enter the liquid chamber. Similarly, the cyclone separator known from U.S. Pat. No. 4,824,449 separates liquid droplets or dust particles in a high pressure region at the circumferential wall of the separator. Re-entrainment of individual droplets can occur when the shear forces from high velocity flow remove the droplets from the collection surface. Thus, separation efficiency is limited by the high velocity flows in this region and the possibility of re-entrainment due to shear.

Another fundamental difference between the separator of this invention and prior art systems is that liquid removal does not rely on gravity. Impingement separators known from U.S. Pat. Nos. 4,198,215, 4,504,285, 4,824,449 require specific gravitational orientation for liquid removal. The separator of this invention will perform efficiently and consistently in any gravitational environment.

Finally, a fundamental difference and benefit between the separator of this invention and prior art systems is that shear from the secondary flow aids, rather than impedes, separation. The secondary flow is strongest in the laminar region. A laminar flow is introduced that has low velocity, but a strong secondary flow pattern. Thus, the possibility of re-entrainment is reduced and the droplets are moved to the low pressure region due to shear from the secondary flow. In contrast, impingement separators known from U.S. Pat. Nos. 4,198,215, 4,504,285, and 4,824,449, are limited by high velocity flows and the possibility of re-entrainment at the liquid/vapor interface due to shear from the main channel flow.

The apparatus for practicing the method of the present invention may include a curved channel, having an inlet at one end through which is introduced a laminar flow of a liquid/gas mixture and multiple discharge ports. The flow channel may be either coiled or formed into a spiral. The radius of curvature of the channel and the channel diameter may be adjusted to maximize separation efficiency. For large volumes of liquid/gas mixtures this invention may be used in parallel and for small droplet sizes it may be used as a scrubber. In addition, with an internal liquid drain line and cooling liquid channel, the invention may be used as a heat exchanger. It will be noted that with the method and apparatus of the present invention separation is possible with a minimum of equipment, low pressure drop, no moving parts, a minimum power requirement, and is compact in size.

In addition to the above noted advantages, the present invention provides a device that is very attractive when environmental, operator and plant safety, and economic factors are considered in the design and use of a separator. For example, the compactness and the efficiency of the gas separator will have minimal impact on the environment. No moving parts within the separator provides less chance of operator error or equipment malfunction that may enganger the operator or plant.

Economic factors that make the separator of the present invention attractive include the price savings resulting from the minimization of materials used to construct the separator, and the ease in which the separator can be incorporated into existing systems with little modification. Another economic advantage is that the compactness of a spiral or coiled separator of the present invention allows a unique adaptation to fit the specific needs of an application. The separator of the present invention is easy to install by installing it directly into the fluid line. In addition, the simplicity of the separator minimizes maintenance and repair which would otherwise cause significant production down-time.

DETAILED DESCRIPTION OF THE PREFERRED EMBODIMENT

Figure 1A:
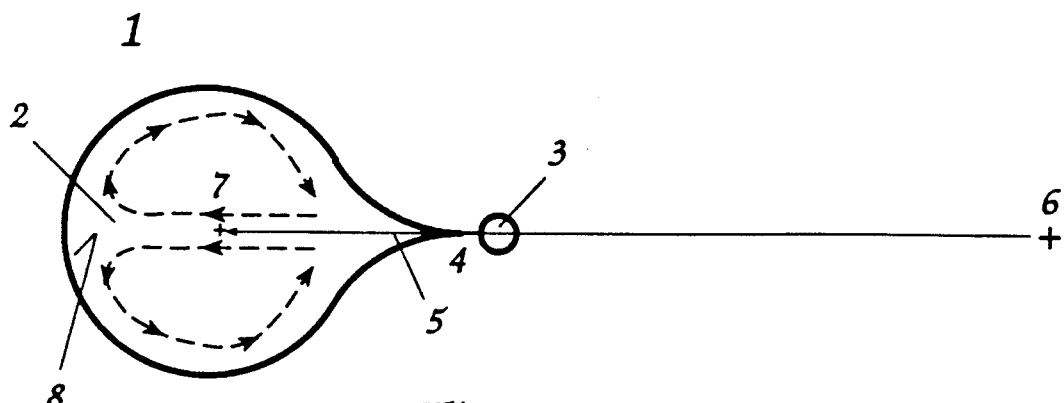
FIG. 1a is an enlarged sectional view of the flow channel.

Referring first to FIG. 1a, a preferred embodiment of the invention 1 will be described for separating liquid from a gas mixture. The main components are a flow channel 2, a liquid collection artery 5, and a liquid drain line 3 connected by bleed ports 4. The primary movement of the gas mixture through the separator is in an axial direction through the main channel. However, secondary flows form within the main channel that assist in removing the separated liquid from the main channel. Referring to FIG. 1a, liquid droplets are impinged on the wall 8 and migrate, in the directions shown by the solid arrows, to the inner radius where the collection artery 5 is located. The liquid is retained in the collection artery, and enters into the external liquid drain line 3 via bleed ports 4. The droplets migrate toward the collection artery 5 under the influence of shear due to the secondary flow. The unique geometry of the separator of the present invention allows the secondary flows to develop and significantly increase the efficiency of the separator.

A laminar flow is introduced into the tear drop shaped flow channel 2 in the axial direction. The radius of curvature of the channel is generally referred to as the distance from separator centerpoint 6 to the channel centerpoint 7. The channel radius is the distance from channel centerpoint 7 to the outside channel wall 8. The length of tubing, radius of curvature of the channel (which may be fixed or varied), and channel radius depend on the allowable pressure drop, liquid load, and the range of liquid droplet size. Bleed ports 4 may be at any location along the flow path and are not limited in numbers. The bleed ports may be left open continually or alternately opened and closed, depending on the application, to avoid gas entering the liquid drain line.

Figure 1B:
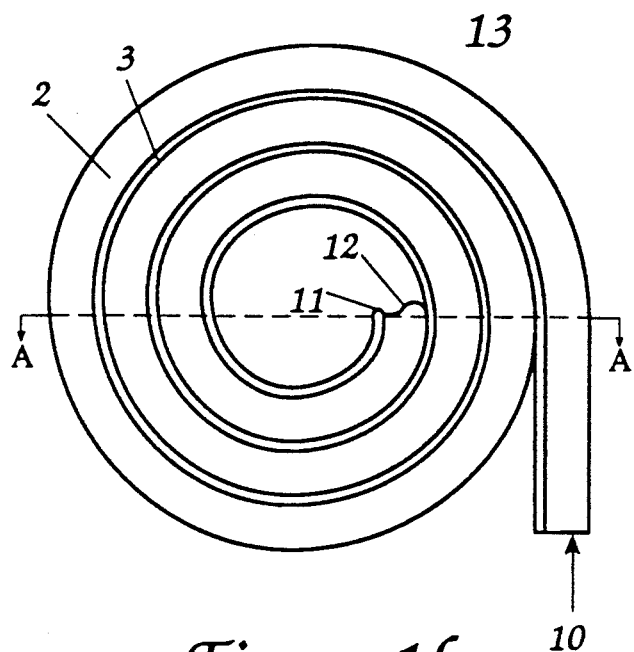
FIG. 1b is a schematic view of one embodiment of the present invention.

FIG. 1b is a schematic representation of a first embodiment of the separator of the present invention. Separator 13 includes a length of tubing formed in the shape of a spiral passageway. The liquid/gas mixture enters the separator at inlet 10. The liquid drain is parallel to the main flow channel 2. The substantially liquid free gas exits the separator through outlet port 12 and the liquid exits through line 11.

Figure 1C:
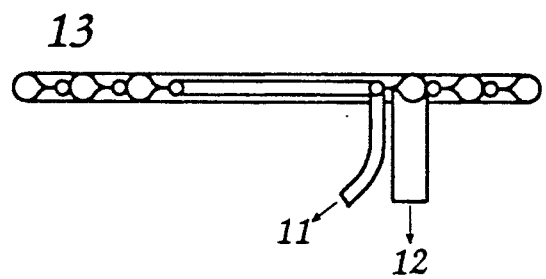
FIG. 1c is a cross sectional view taken along the line A—A of FIG. 1b showing details of the spiral flow passage.

FIG. 1c shows a sectional view of the separator 13. Details of the exit ports 11 and 12 for both liquid and substantially liquid free gas are shown, respectively.

Figure 2A:
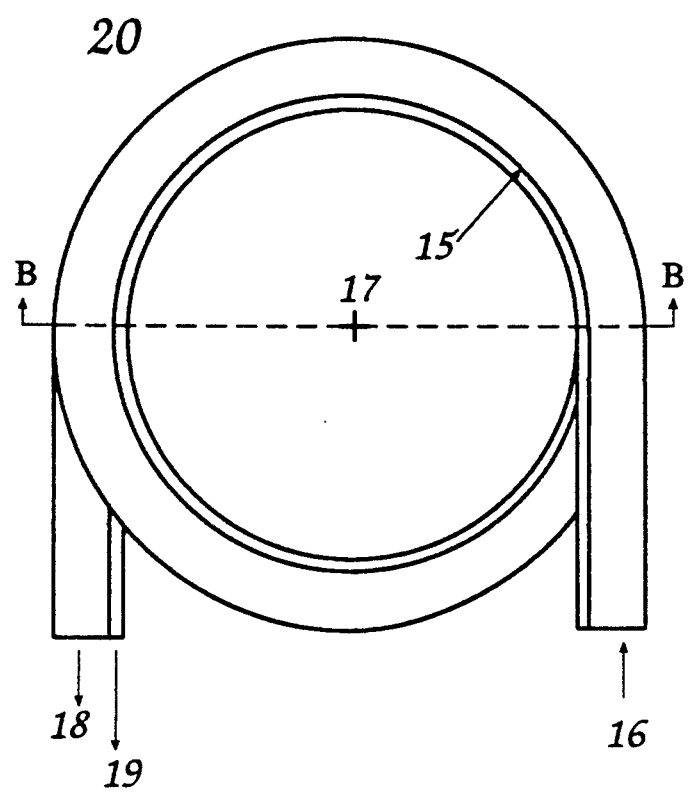
FIG. 2a is a schematic view of another embodiment of the apparatus of the present invention.
Figure 2B:
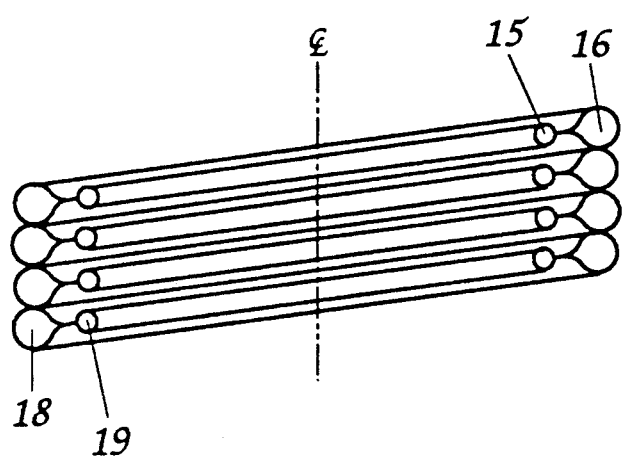
FIG. 2b is a cross sectional view taken along the line B—B of FIG. 2a showing details of the coiled flow passage.

The separator tubing may also be formed in the shape of a coil represented by FIGS. 2a and 2b. In this embodiment the liquid/gas mixture enters the separator through inlet 16 and exits tangentially through outlet 18. Similarly, the liquid channel 15 parallels the main channel and exits the separator through outlet 19. The radius of curvature of the channel is the distance from the coil axis 17 to the center of channel 7 (as denoted in FIG. 1a).

Figure 3:
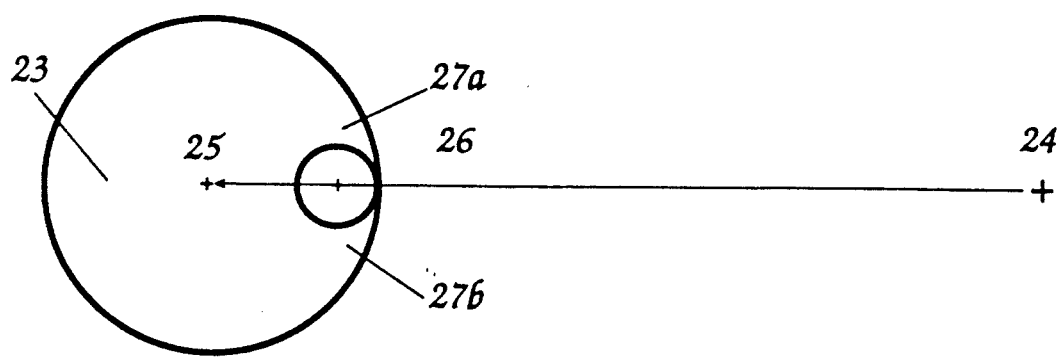
FIG. 3 is an enlarged sectional view of another embodiment of the apparatus of the present invention. The separator comprises a circular flow passage with an internal liquid drain line and two liquid collection arteries.

Referring now to FIG. 3 an alternate embodiment of the invention will be described. FIG. 3 is an enlarged sectional view of the separator. The main channel 23 has a circular cross section and has an internal liquid drain line 26 and two liquid collection arteries 27a and 27b. Perforations or valves allow liquid to pass from the arteries 27a and 27b into drain line 26 at one or more locations. The separator tubing may be coiled or formed in the shape of a spiral similar to the embodiments described in FIGS. 1b,c and 2a,b, respectively, with a radius of curvature defined by the distance from separator centerpoint 24 to the main channel centerpoint 25.

Figure 4:
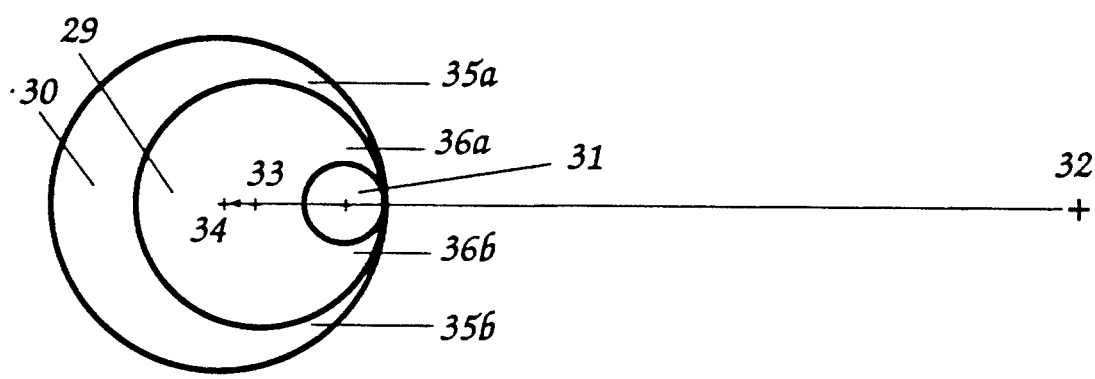
FIG. 4 is an enlarged sectional view of another embodiment of the apparatus of the present invention. The separator comprises a circular flow passage with an internal liquid drain line, two liquid collection arteries, and a surrounding cooling or heating liquid channel.

Referring now to FIG. 4 an alternate embodiment of the invention will be described. An enlarged sectional view of the flow channel is seen in FIG. 4. The main channel 29 has a circular cross section and has an internal liquid drain line 31 and a surrounding cooling fluid channel 30. There are two liquid collection arteries 36a and 36b and a liquid drain line 31 into which liquid is continually or periodically drained. This embodiment may include condensable vapors in the main channel 29 and an evaporating fluid in the surrounding channel 30 and may include multiple collection arteries 35a, 35b, 36a, and 36b. The separator tubing may be coiled or formed in the shape of a spiral similar to the embodiments described in FIGS. 1b,c and 2a,b, respectively, with a radius of curvature defined by the distance from separator centerpoint 32 to the main channel centerpoint 33. Similarly, the radius of curvature for the surrounding channel is defined by the distance from the point 32 to the surrounding channel centerpoint 34.

Figure 5:
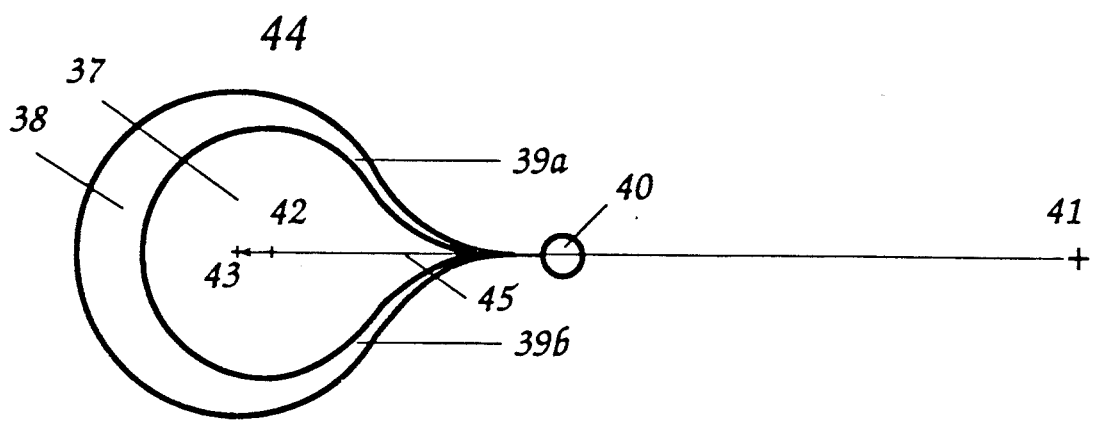
FIG. 5 is an enlarged sectional view of another embodiment of the apparatus of the present invention. The separator comprises a tear drop shaped main flow channel, a tear drop shaped cooling liquid channel surrounding it, and an external liquid drain line.

Referring now to FIG. 5 an alternate embodiment of the invention will be described. An enlarged sectional view of the flow channel is seen in FIG. 5 and is generally denoted as number 44. The flow channel has a tear drop shaped cross section 37 through which flows a liquid/vapor mixture, a surrounding cooling fluid channel 38 with a tear drop shaped cross section, and an external liquid drain line 40. The main channel radius is the distance from centerpoint 42 to the main channel wall. Similarly the cooling fluid channel radius is the distance from centerpoint 43 to the surrounding channel wall. The radius of curvature of the tubing is generally referred to as the distance from the separator centerpoint 41 to the main channel centerpoint 42. Similar to the above embodiments, the length of separator tubing, main channel radius, cooling fluid channel radius, and radius of curvature of the separator tubing depend on the allowable pressure drop, liquid load, and droplet size. In addition, this embodiment may include condensable vapors in the main channel 37 and an evaporating fluid in the surrounding channel 38. This requires multiple collection arteries 39a, 39b and 45.

The use of a specific geometry of one of the various embodiments of the invention presented herein, is dependent upon the application of the separator and the requirements of the separation process. For example, applications having large volumes of gas/liquid mixtures needing to be separated may best be suited by plural spiral configuration separators used in parallel.

The use of spiral or coiled separators make the present invention far more compact than prior art separators. Another way that the present invention achieves compactess is by the inclusion of the drain line within the main channel shown in several of the embodiments heretofore described.

The external drain line embodiments have an advantage of bleed port locations that are easily adjusted or modified, and there is no size limit for the drain line.

The apparatus of the present invention provides a means for separating a liquid from a gas or vapor mixture of a simple construction, operation, and maintenance. Other applications may include: combined application wet scrubbers, thermal management systems, gas coolers and air conditioning, and vaporization processes. The spray of washing drops in scrubbers is characterized by fine spray and high liquid loading. The present invention will provide an efficient means for such separation as well as combined applications. Combined applications are a compromise between high velocities for particle separation and low velocities for gas scrubbers. The present invention will operate at relatively low velocities and the secondary flow will aid in droplet separation.

The present invention may also be used as a heat exchanger with an internal liquid drain line and a surrounding cooling liquid channel for the separation of condensable vapors from a gas mixture. A laminar flow of a vapor mixture is introduced into the main flow channel. The coolant channel surrounds the main flow channel causing the vapors to condense into liquid droplets which collect in the artery. The separation of such droplets can be done efficiently and inexpensively with the present invention.

Gas coolers cause condensation not only on the cooling surface, but often a condensation mist is formed as well. The fineness of the mist depends on the physical properties of the gas as well as operating conditions. For certain applications, the present invention would provide for the efficient removal of condensation mist. In addition to coolers, droplet separators are needed behind air scrubbers and air inlets for air conditioning applications.

During liquid evaporation, droplets are entrained by the rising vapor. It may be necessary to separate these droplets for several reasons. First, droplets can lead to contamination of the condensate. Second, valuable chemicals may become lost in the evaporation process. Finally, solids contained in the droplets may lead to unwanted deposits and blockages.

It should be apparent that many modifications could be made to the separator which would still be encompassed within the spirit of the present invention. It is intended that all such modifications may fall within the scope of the appended claims.

What is claimed is:

1. An apparatus for separating liquid from a liquid/gas or liquid/vapor mixture comprising:
   a curved main channel with an inlet into which flows the mixture, said curved channel forming a surface against which liquid droplets within the mixture impinge against;
   a collection artery for collecting droplets separated from the mixture;
   a plurality of bleed ports connected to said collection artery for removing the separated droplets from said channel;
   wherein, the liquid portion of the mixture is separated from the remainder of the mixture by said apparatus.

2. An apparatus as claimed in claim 1, wherein,
   a liquid drain line is connected to said plurality of bleed ports for transporting the liquid droplets separately from said main channel.

3. An apparatus as claimed in claim 1, wherein,
said main channel constructed in cross section as a teardrop shape having a substantially circular portion and a pointed portion, said pointed portion of said main channel acting as said collection artery.

4. An apparatus as claimed in claim 2, wherein,
said main channel constructed in cross section in a substantially circular shape that is curved along the central axis of said main channel, said curved main channel comprising an inner radius and an outer radius;
said liquid drain line is located against a wall of said main channel, said collection artery comprising two collection points at two intersection points of said liquid drain line with said wall of said main channel.

5. An apparatus as claimed in claim 4, wherein
said liquid drain line is connected to said main channel wall at said inner radius of said main channel.

6. An apparatus as claimed in claim 1, wherein,
said apparatus further comprises an additional fluid channel at least partially surrounding said main channel for effecting heat exchange.

7. An apparatus as claimed in claim 2, wherein,
said drain line is at a lower pressure than said main channel to assist in liquid drainage.

8. An apparatus as claimed in claim 1, wherein,
said main channel is formed in a spiral configuration.

9. An apparatus as claimed in claim 1, wherein,
said main channel is formed in a coil configuration.

10. An apparatus as claimed in claim 1, wherein,
said main channel having a construction in cross section that has a substantially circular portion that is curved along the central axis of said main channel, said curvature of said main channel defining an inner radius and an outer radius, said collection artery located at said inner radius of said main channel.

* * * * *